United States Patent
Yeh et al.

(10) Patent No.: US 8,625,313 B2
(45) Date of Patent: Jan. 7, 2014

(54) HIGH-SIDE SYNCHRONOUS RECTIFIER CIRCUITS AND CONTROL CIRCUITS FOR POWER CONVERTERS

(75) Inventors: Chia-Yo Yeh, Changhua (TW); Jhih-Da Hsu, Sindian (TW); Ying-Chieh Su, Sijhih (TW); Chien-Chun Huang, Zhongli (TW); Chou-Sheng Wang, Keelung (TW)

(73) Assignee: System General Corporation, Sindian, Taipei County (TW)

( * ) Notice: Subject to any disclaimer, the term of this patent is extended or adjusted under 35 U.S.C. 154(b) by 328 days.

(21) Appl. No.: 13/112,414

(22) Filed: May 20, 2011

(65) Prior Publication Data

US 2012/0033460 A1 Feb. 9, 2012

Related U.S. Application Data

(60) Provisional application No. 61/370,478, filed on Aug. 4, 2010.

(51) Int. Cl.
*H02M 3/335* (2006.01)

(52) U.S. Cl.
USPC ..................... 363/21.14; 363/21.13

(58) Field of Classification Search
USPC ............. 363/21.06, 21.14, 127, 21.05, 21.13; 323/288
See application file for complete search history.

(56) References Cited

U.S. PATENT DOCUMENTS 7,206,208 B1 * 4/2007 Hsu et al. .................... 363/21.06
7,440,298 B2 * 10/2008 Yang .............................. 363/89

* cited by examiner

*Primary Examiner* — Gary L Laxton
(74) *Attorney, Agent, or Firm* — McClure, Qualey & Rodack, LLP

(57) ABSTRACT

A control circuit for a switching power converter is provided. The control circuit is installed between a secondary side and an output of the power converter and coupled to control a switching device. The control circuit includes a linear predict circuit, a reset circuit, a charge/discharge circuit, and a PWM circuit. The linear predict circuit is coupled to receive a linear predict signal from the secondary side for generating a charging signal. The reset circuit is couple to receive a resetting signal for generating a discharging signal. The charge/discharge circuit is coupled to receive the charging signal and the discharging signal for generating a ramp signal. The PWM circuit is coupled to receive the linear predict signal for enabling a switching signal and receive the ramp signal for resetting the switching signal.

8 Claims, 6 Drawing Sheets

HIGH-SIDE SYNCHRONOUS RECTIFIER CIRCUITS AND CONTROL CIRCUITS FOR POWER CONVERTERS

CROSS REFERENCE TO RELATED APPLICATIONS

This application claims the benefit of U.S. Provisional Application No. 61/370,478, filed on Aug. 4, 2010, the contents of which are incorporated herein by reference.

BACKGROUND OF THE INVENTION

1. Field of the Invention

The present invention relates to power converters and more particularly, relates to the synchronous rectifier circuits of power converters.

2. Description of the Related Art

A synchronous rectifier controller in nowadays is broadly used to replace really a rectifier for decreasing power loss. A traditional synchronous rectifier controller is installed on the low-side of a secondary side of a power converter. Therefore, a ground terminal of the synchronous rectifier controller is coupled to another ground of the secondary side of the power converter. However, the drawback of the traditional synchronous rectifier controller is that there is switching loss and electric-magnetic-interference (EMI) problem because of the switching operation of the ground of the secondary side of the power converter.

BRIEF SUMMARY OF THE INVENTION

An exemplary embodiment of a control circuit for a switching power converter is provided. The control circuit is installed between a secondary side of the switching power converter and an output of the power converter and coupled to control a switching device. The control circuit comprises a linear predict circuit, a reset circuit, a charge/discharge circuit, and a pulse width modulation (PWM) circuit. The linear predict circuit is coupled to receive a linear predict signal from the secondary side for generating a charging signal. The reset circuit is coupled to receive a resetting signal for generating a discharging signal. The charge/discharge circuit is coupled to receive the charging signal and the discharging signal for generating a ramp signal. The PWM circuit is coupled to receive the linear predict signal for enabling a switching signal and receive the ramp signal for resetting the switching signal.

An exemplary embodiment of a synchronous rectifier circuit for a power converter is provided. The synchronous rectifier circuit comprises a power switching device, a diode, and a control circuit. The power switching device is coupled between a secondary side of the power converter and an output of the power converter for rectifying. The diode is coupled to the power switching device in parallel. The control circuit is installed between the secondary side of the power converter and the output of the power converter. The control circuit is operated to receive a linear predict signal and a ramp signal for turning on/off the power switching device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
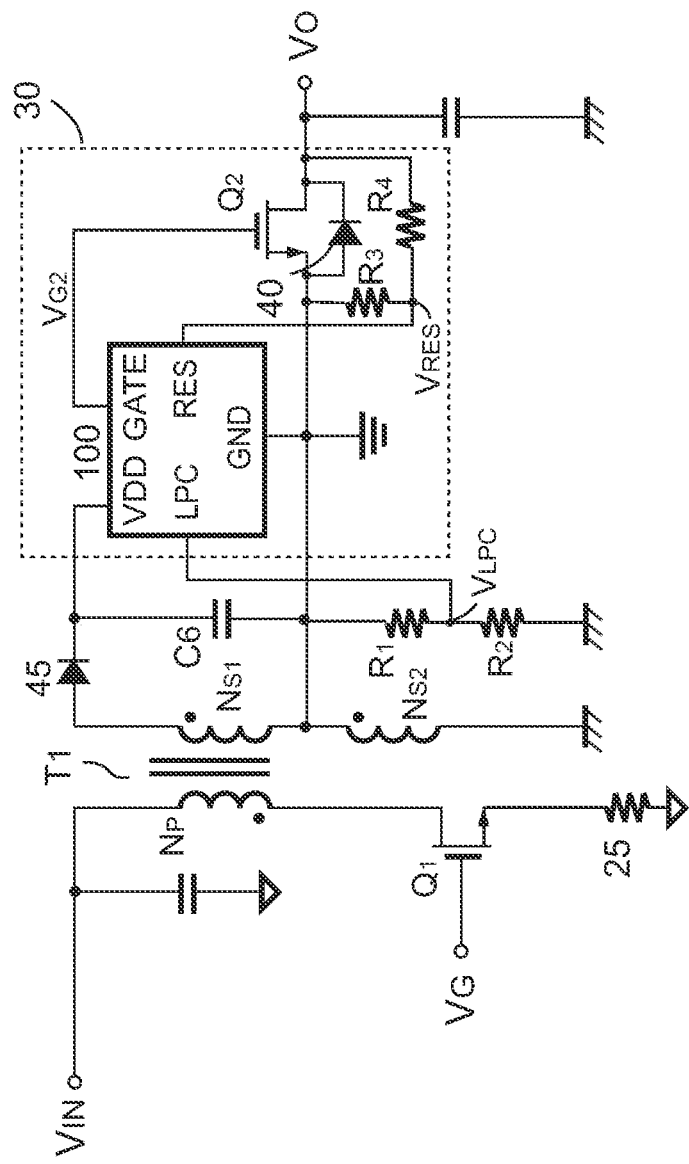
FIG. 1 shows an exemplary embodiment of a switching power converter.

As illustrated in an embodiment of FIG. 1, a transformer $T_1$ is coupled between an unregulated input voltage $V_{IN}$ and an output $V_O$ of a switching power converter. As shown in FIG. 1, the transformer $T_1$ comprises a primary winding $N_P$ and two secondary windings $N_{S1}$ and $N_{S2}$. A power switch $Q_1$ is coupled to the primary winding $N_P$ at an input of the transformer $T_1$ to regulate the transfer of energy from the unregulated input voltage $V_{IN}$ to the output $V_O$ of the switching power converter. The power switch $Q_1$ is coupled to receive a switching signal $V_G$ to control switching of the power switch $Q_1$. A resistor 25 is coupled between the power switch $Q_1$ and a ground of the primary side of the transformer $T_1$. A synchronous rectifier circuit 30 is coupled between the high-side of the secondary winding $N_{S1}$ of the transformer $T_1$ and the output $V_O$.

The synchronous rectifier circuit 30 is composed of a switching controller 100 which serves as a control circuit for the switching power converter. The switching controller 100 generates a pulse width modulation (PWM) signal $V_{G2}$ which serves as a switching signal for controlling a power transistor $Q_2$, wherein the power transistor $Q_2$ serves as a power switching device for the switching power converter. A diode 40 is connected to the power transistor $Q_2$ in parallel, wherein the diode 40 is a parasitic diode. The switching controller 100 includes a power terminal VDD, a linear predicting terminal LPC, a reset terminal RES, a ground terminal GND, and a control terminal GATE. The power terminal VDD is coupled to the secondary winding $N_{S1}$ to receive a rectified power source through a diode 45 and a capacitor $C_6$. Resistors $R_1$ and $R_2$ are coupled in series between the capacitor $C_6$ and a ground of a secondary side of the transformer $T_1$, and a linear predict signal $V_{LPC}$ is generated at the joint of the resistors $R_1$ and $R_2$. Resistors $R_3$ and $R_4$ are coupled in series and coupled to the power transistor $Q_2$ in parallel, and a resetting signal $V_{RES}$ is generated at the joint of the resistors $R_3$ and $R_4$. The linear predicting terminal LPC is coupled to receive the linear predict signal $V_{LPC}$ for charging and the reset terminal RES is coupled to receive the resetting signal $V_{RES}$ for resetting. The control terminal GATE is coupled to generate the PWM signal $V_{G2}$ to control the power transistor $Q_2$.

Figure 2A:
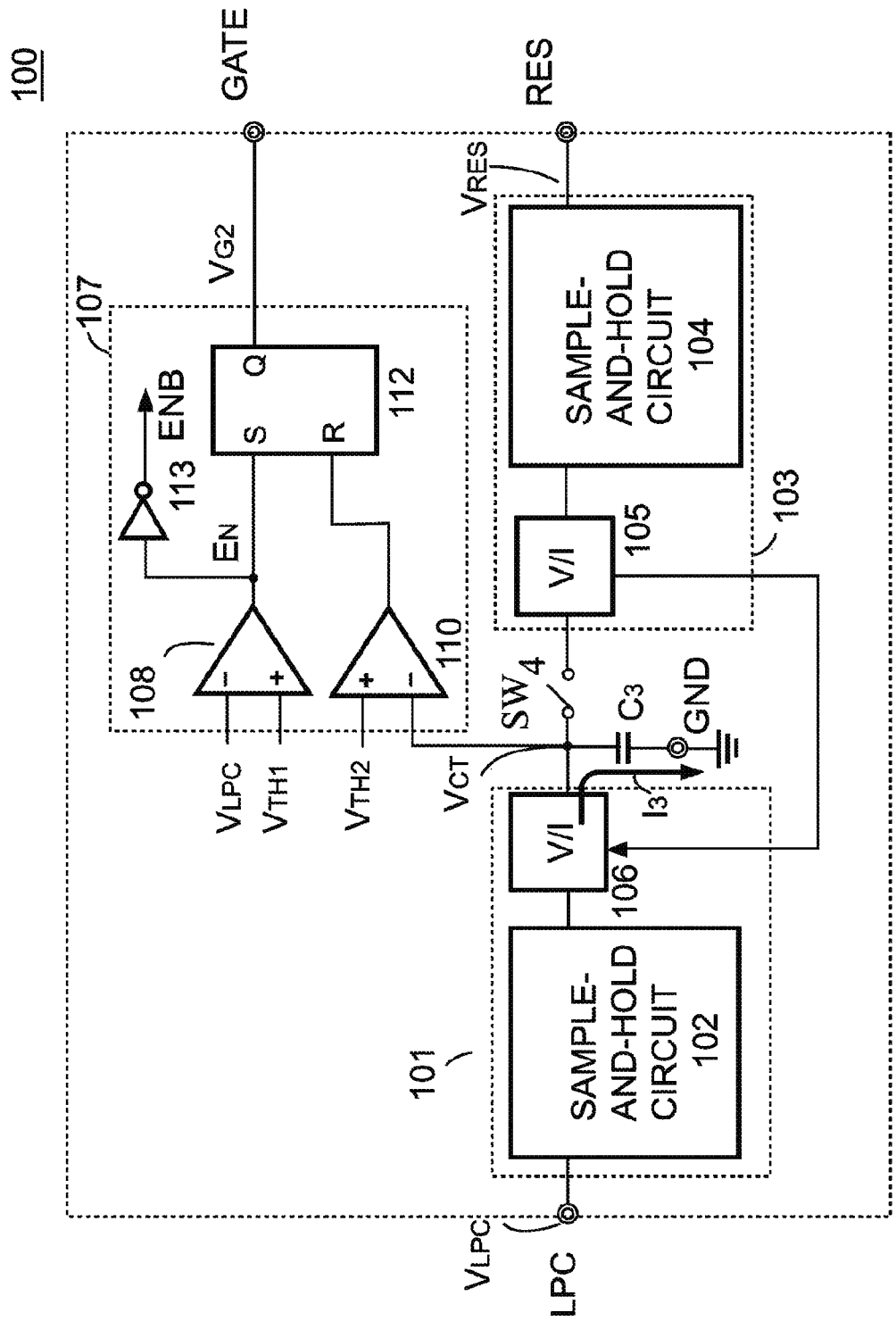
FIGS. 2A and 2B show an exemplary embodiment of a switch controller of the switching power converter in FIG. 1.
Figure 2B:
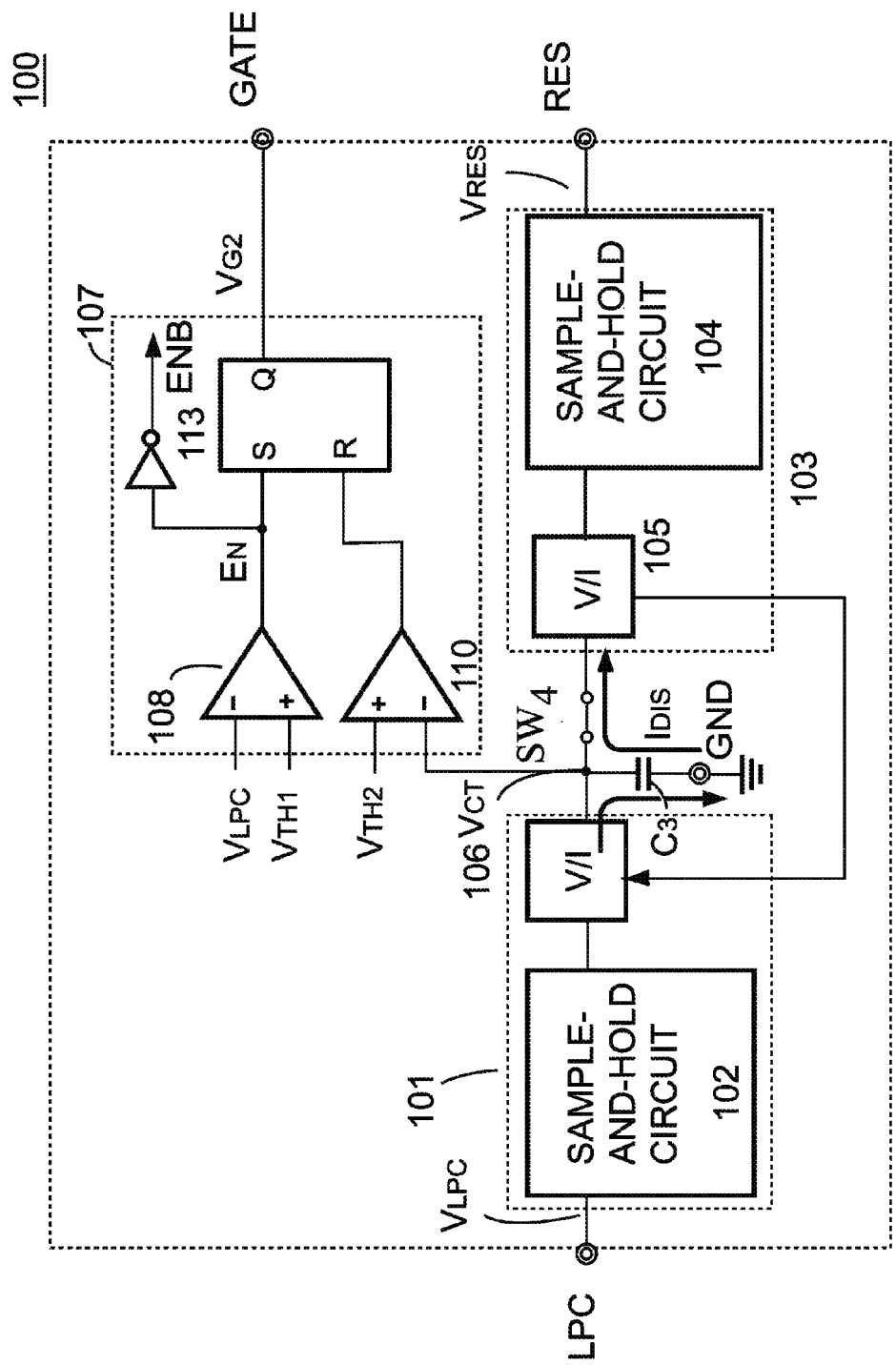

FIGS. 2A and 2B show an exemplary embodiment of the switching controller 100. The switching controller 100 comprises a linear predict circuit 101, a reset circuit 103, a PWM circuit 107, and a charge/discharge circuit. The linear predict circuit 101 is composed of a sample-and-hold circuit 102 and a voltage-to-current converter (V/I) 106. The reset circuit 103 is also composed of a sample-and-hold circuit 104 and a voltage-to-current converter (V/I) 105. The charge/discharge circuit comprises a capacitor $C_3$ and a switch $SW_4$. The PWM circuit 107 is composed of an SR-flip-flop 112, an inverter 113, and comparators 108 and 110.

The linear predict circuit 101 is coupled to receive the linear predict signal $V_{LPC}$ for charging to the capacitor $C_3$ through a sampling-and-hold operation. The linear predict circuit 101 is composed of the sample and hold circuit 102 and the voltage to current converter (V/I) 106. The sample-and-hold circuit 102 of the linear predict circuit 101 is coupled to receive the linear predict signal $V_{LPC}$ for sampling at a rising edge of the linear predict signal $V_{LPC}$, and then hold a sampling signal $V_{SL}$ (shown in FIG. 3) at a falling edge of the linear predict signal $V_{LPC}$ to generate a hold signal $V_{HL}$ (shown in FIG. 3). The voltage-to-current converter (V/I) 106 is coupled to generate a charging current (also referred as a charging signal) $I_3$ in response the hold signal $V_{HL}$.

The reset circuit 103 is also composed of the sample-and-hold circuit 104 and the voltage-to-current converter (V/I) 105. The reset circuit 103 is coupled to receive the resetting signal $V_{RES}$ to generate a discharge signal for resetting the PWM circuit 107 through the charge/discharge circuit. The sample-and-hold circuit 104 is coupled to receive the resetting signal $V_{RES}$ for sampling at a rising edge of the resetting signal $V_{RES}$, and hold the sampling result (sampling signal $V_{SR}$ shown in FIG. 5) at a falling edge of the resetting signal $V_{RES}$ to generate a hold signal $V_{HR}$ (shown in FIG. 5). The voltage-to-current converter (V/I) 105 is coupled to generate a discharging current (also referred as a discharging signal) $I_{DIS}$ in response the hold signal $V_{HR}$ for resetting the PWM circuit 107 through the charge/discharge circuit.

The charge/discharge circuit comprises the capacitor $C_3$ and the switch $SW_4$, which are coupled in series, for receiving the charging current $I_3$ and receiving the discharging current $I_{DIS}$ through the switch $SW_4$. The capacitor $C_3$ is coupled to receive the charging current $I_3$ for charging, and the discharging current $I_{DIS}$ is generated from the voltage-to-current converter (V/I) 105 through the switch $SW_4$ while the switch $SW_4$ is turned on as shown in FIG. 2B. A ramp signal $V_{CT}$ is thus generated at the joint of the capacitor $C_3$ and the switch $SW_4$ in response to the charging current $I_3$ and the discharging current $I_{DIS}$.

The SR-flip-flop 112, the inverter 113, and the comparators 108 and 110 develop the PWM circuit 107 for generating the PWM signal $V_{G2}$ at the output terminal Q of the SR-flip-flop 112 in response to the linear predict signal $V_{LPC}$ and the ramp signal $V_{CT}$. The setting terminal S of the SR-flip-flop 112 is controlled by an output of the comparator 108. The comparator 108 are coupled to receive the linear predict signal $V_{LPC}$ and a first threshold $V_{TH1}$ for comparison. The resetting terminal R of the SR-flip-flop 112 is controlled by an output of the comparator 110. The comparator 110 is couple to receive the ramp signal $V_{CT}$ and a second threshold $V_{TH2}$ for comparison. The comparator 108 generates an enabling signal $E_N$ according to the comparison result. The inverter 113 is coupled to receive the enabling signal $E_N$ and generate an inverse enabling signal ENB.

Figure 3:
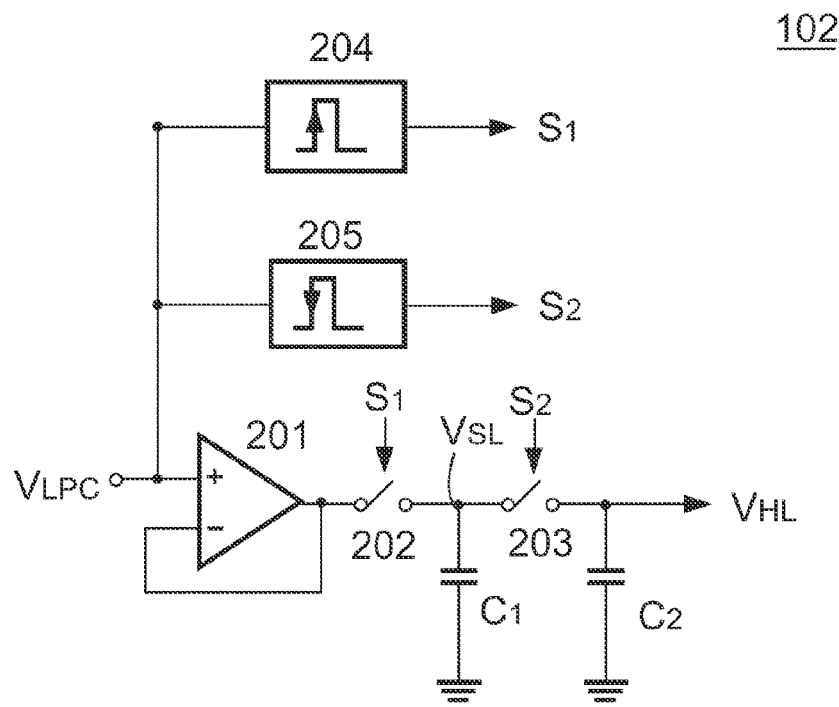
FIG. 3 shows an exemplary embodiment of a sample-and-hold circuit of a linear predict circuit in FIGS. 2A and 2B.

FIG. 3 shows an exemplary embodiment of the sample-and-hold circuit 102. A buffer 201, a switch 202, and a capacitor $C_1$ form a sample circuit, and another switch 203 and a capacitor $C_2$ form a hold circuit. The linear predict signal $V_{LPC}$ is coupled to generate a first signal $S_1$ and a second signal $S_2$ to control the switch 202 and the switch 203 through pulse generation circuits 204 and 205, respectively. The first signal $S_1$ is enabled in response to the rising edge of the linear predict signal $V_{LPC}$ via the pulse generation circuits 204, and the second signal $S_2$ is enabled in response to the falling edge of the predict signal $V_{LPC}$ via the pulse generation circuits 205. The sampling signal $V_{SL}$ is generated through the switch 202 at the rising edge of the linear predict signal $V_{LPC}$, and the hold signal $V_{HL}$ is thus generated in the capacitor $C_2$ at the falling edge of the linear predict signal $V_{LPC}$. The hold signal $V_{HL}$ is correlated to the high level of the linear predict signal $V_{LPC}$.

Figure 4:
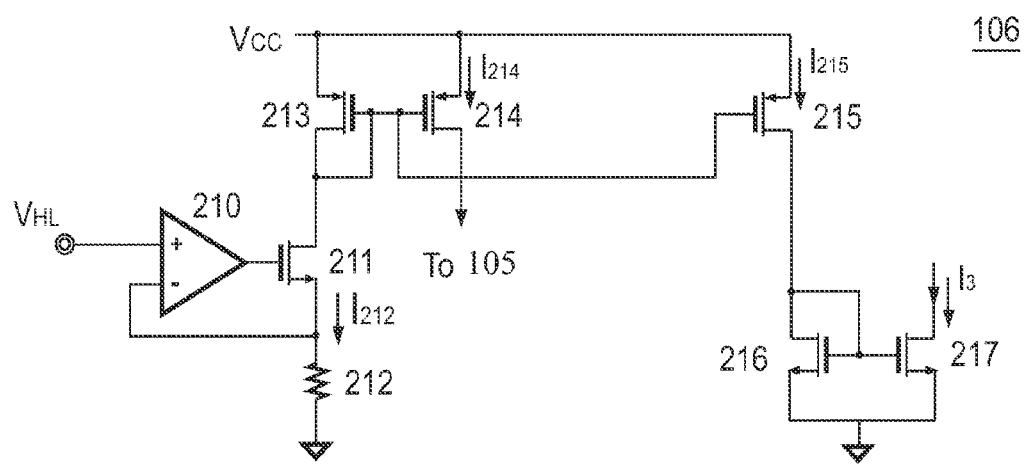
FIG. 4 shows an exemplary embodiment of a voltage-to-current converter of a linear predict circuit in FIGS. 2A and 2B.

FIG. 4 shows an exemplary embodiment of the voltage-to-current converter (V/I) 106, wherein an operational amplifier 210, a transistor 211, and a resistor 212 develop a V-to-I circuit to generate a current $I_{212}$ in response to the hold signal $V_{HL}$. Transistors 213, 214, 215, 216, and 217 develop current mirrors to generate currents $I_{214}$, $I_{215}$ and $I_3$ in response to the current $I_{212}$. The charging current $I_3$ is proportional to the current $I_{212}$. The charging current $I_3$ is coupled to the capacitor $C_3$ for charging.

Figure 5:
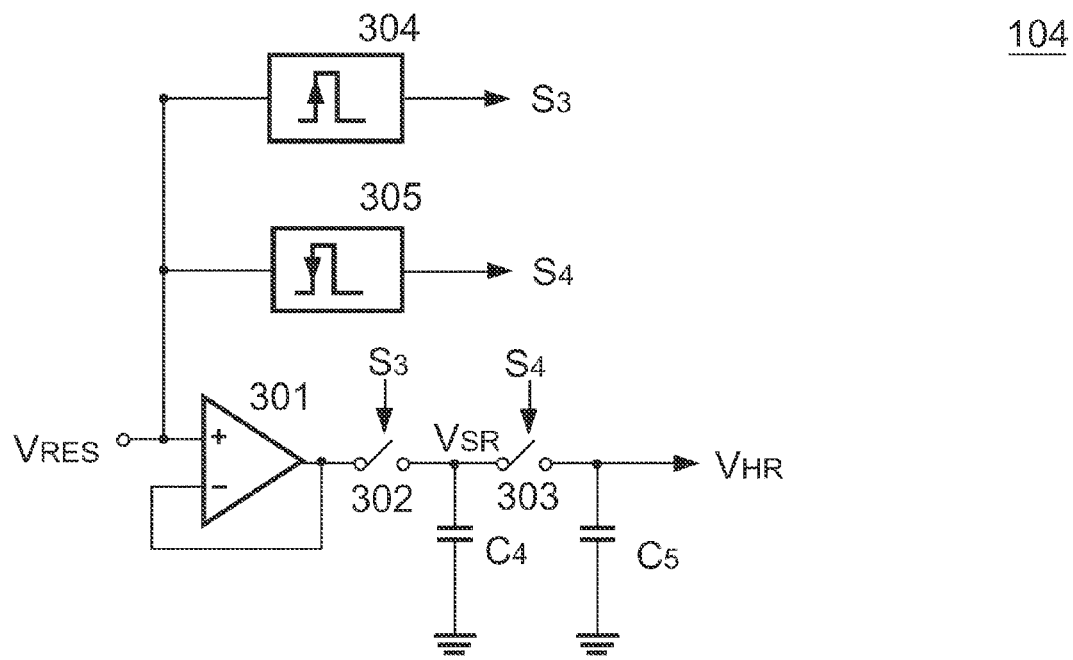
FIG. 5 shows an exemplary embodiment of a sample-and-hold circuit of a reset circuit in FIGS. 2A and 2B.

FIG. 5 shows an exemplary embodiment of the sample-and-hold circuit 104. A buffer 301, a switch 302, and a capacitor $C_4$ form a sample circuit, and another switch 303 and a capacitor $C_5$ form a hold circuit. The resetting signal $V_{RES}$ is coupled to generate a first signal $S_3$ and a second signal $S_4$ to control switch 302 and switch 303 through pulse generation circuits 304 and 305, respectively. The first signal $S_3$ is enabled in response to the rising edge of the resetting signal $V_{RES}$ via the pulse generation circuits 304, and the second signal $S_2$ is enabled in response to the falling edge of the resetting signal $V_{RES}$ via the pulse generation circuits 305. The sampling signal $V_{SR}$ is generated through the switch $S_3$ at the rising edge of the resetting signal $V_{RES}$, and the hold signal $V_{HR}$ is thus generated in the capacitor $C_5$ at the falling edge of the resetting signal $V_{RES}$. The hold signal $V_{HR}$ is correlated to the high level of the resetting signal $V_{RES}$.

Figure 6:
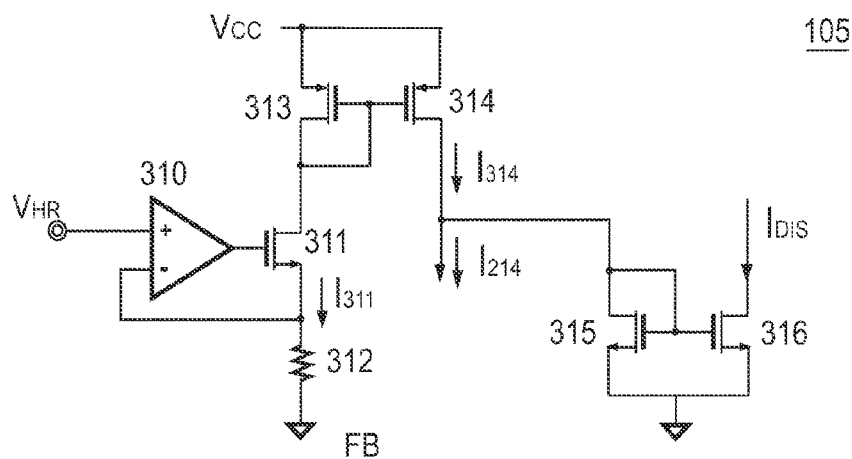
FIG. 6 shows an exemplary embodiment of the voltage-to-current converter of a reset circuit in FIGS. 2A and 2B.

FIG. 6 shows an exemplary embodiment of the voltage-to-current converter (V/I) 105, wherein an operational amplifier 310, a transistor 311, and a resistor 312 develop a V-to-I circuit to generate a current $I_{311}$ in response to the hold signal $V_{HR}$. Transistors 313 and 314 develop a current mirror to generate currents $I_{314}$ in response to the current $I_{311}$. Other transistors 315 and 316 develop another current mirror to generate the discharging current $I_{DIS}$ in response to the current $I_{314}$ and the current $I_{214}$ from the voltage-to-current converter (V/I) 106, so the discharging current $I_{DIS}$ can be expressed, $I_{DIS}=I_{314}-I_{214}$.

From the above description, and referring to FIG. 4 to FIG. 6. The current $I_{314}$ is mirrored form the current $I_{311}$, and the current $I_{311}$ represents the resetting signal $V_{RES}$. The $I_{214}$ is mirrored form the current $I_{212}$, and the current $I_{212}$ represents the linear predict signal $V_{LPC}$. So the discharging current $I_{DIS}$ represents the difference between the resetting signal $V_{RES}$ and the linear predict signal $V_{LPC}$.

Figure 7:
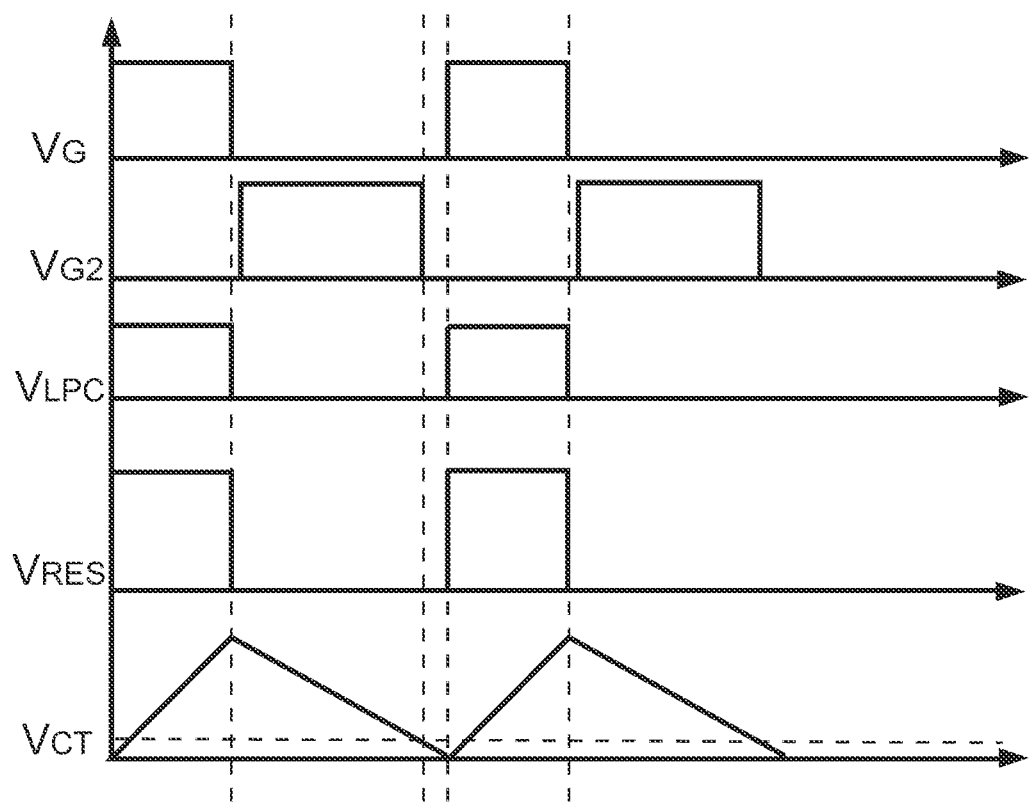
FIG. 7 shows key wave forms of a high-side synchronous rectifier circuit of the switching power converter in FIG. 1.

FIG. 7 shows the key wave forms of the high-side synchronous rectifier circuit. Referring to FIG. 2A to FIG. 6, while the switching signal $V_G$ is enabled, the diode 45 and diode 40 are turned off (reversed biased). The voltage of the linear predict signal $V_{LPC}$ is in a high level, which can be express as $$V_{LPC} = \frac{V_{in}}{n} \times \frac{R_2}{R_1 + R_2},$$

and the PWM signal $V_{G2}$ is disabled in response to the high level of the linear predict signal $V_{LPC}$ at the mean time. The power transistor $Q_2$ is switched off. While the switching signal $V_G$ is disabled, the diode 45 and diode 40 are turned on (forward biased). The PWM signal $V_{G2}$ is enabled in response to the low level of the linear predict signal $V_{LPC}$. The ramp signal $V_{CT}$ is discharged in response to the difference between the resetting signal $V_{RES}$ and the linear predict signal $V_{LPC}$. The PWM signal $V_{G2}$ is disabled once the voltage of the ramp signal $V_{CT}$ is lower then the second threshold $V_{TH2}$.

In summary, the switching controller can be installed at high-side of secondary side of a switching power converter. Therefore, the ground terminal of the switching controller is no more coupled to a ground of low-side of a secondary side of a power converter but coupled to a relative low voltage of the high side winding. So the switching loss and electric-magnetic-interference (EMI) problem caused by the switching operation of the ground of the secondary side of the switching power converter can be solved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit for a switching power converter, the control circuit is installed between a secondary side of the switching power converter and an output of the switching power converter and coupled to control a switching device wherein the control circuit comprises:
   a linear predict circuit, coupled to receive a linear predict signal from the secondary side for generating a charging signal;
   a reset circuit, coupled to receive a resetting signal for generating a discharging signal;
   a charge/discharge circuit, coupled to receive the charging signal and the discharging signal for generating a ramp signal; and
   a pulse width modulation (PWM) circuit, coupled to receive the linear predict signal for enabling a switching signal and receive the ramp signal for resetting the switching signal;
   wherein the linear predict circuit comprises:
   a sample-and-hold circuit, coupled to receive the linear predict signal and generate a hold signal in response to the linear predict signal; and
   a voltage-to-current converter, coupled to receive the hold signal and generate the charging signal in response to the hold signal.

2. The control circuit as claimed in claim 1, wherein the reset circuit comprises:
   a sample-and-hold circuit, coupled to receive the resetting signal and generate a hold signal in response to the resetting signal; and
   a voltage-to-current converter, coupled to receive the hold signal and generate the discharging signal in response to the hold signal.

3. The control circuit as claimed in claim 1, wherein the charge/discharge circuit comprises:
   a capacitor, coupled to receive the charging signal and charged by the charging signal; and
   a switch, coupled to the capacitor in series and receiving the discharging signal;
   wherein the ramp signal is generated at a joint of the capacitor and the switch in response to the charging signal and the discharging signal.

4. The control circuit as claimed in claim 1, wherein the PWM circuit comprises:
   a SR-flip-flop, coupled to generate the switching signal in response to the linear predict signal and the ramp signal;
   a first comparator, coupled to receive the linear predict signal and a first threshold for comparison; and
   a second comparator, coupled to receive the ramp signal and a second threshold for comparison;
   wherein a setting terminal of the SR-flip-flop is controlled by an output of the first comparator and a resetting terminal of the SR-flip-flop is controlled by an output of the second comparator.

5. A synchronous rectifier circuit for a power converter comprising:
   a power switching device, coupled between a secondary side of the power converter and an output of the power converter for rectifying;
   a diode, coupled to the power switching device in parallel; and
   a control circuit, installed between the secondary side of the power converter and the output of the power converter, wherein the control circuit is operated to receive a linear predict signal and a ramp signal for turning on/off the power switching device;
   wherein the control circuit comprises:
   a linear predict circuit, coupled to receive the linear predict signal from the secondary side for generating a charging signal;
   a reset circuit, coupled to receive a resetting signal for generating a discharging signal;
   a charge/discharge circuit, coupled to receive the charging signal and the discharging signal for generating the ramp signal; and
   a pulse width modulation (PWM) circuit, coupled to receive the linear predict signal for enabling a switching signal and receive the ramp signal for resetting the switching signal;
   wherein the linear predict circuit comprises:
   a sample-and-hold circuit, coupled to receive the linear predict signal and generate a hold signal in response to the linear predict signal; and
   a voltage-to-current converter, coupled to receive the hold signal and generate the charging signal in response to the hold signal.

6. The synchronous rectifier circuit as claimed in claim 5, wherein the reset circuit comprises:
   a sample and hold circuit, coupled to receive the resetting signal and generate a hold signal in response to the resetting signal; and
   a voltage-to-current converter coupled to receive the hold signal and generate the discharging signal in response to the hold signal.

7. The synchronous rectifier circuit as claimed in claim 5, wherein the charge/discharge circuit comprises:
   a capacitor, coupled to receive the charging signal and charged by the charging signal; and
   a switch, coupled to the capacitor in series and receiving the discharging signal;
   wherein the ramp signal is generated at a joint of the capacitor and the switch in response to the charging signal and the discharging signal.

8. The synchronous rectifier circuit as claimed in claim 5, wherein the PWM circuit comprises:
   a SR-flip-flop, coupled to generate the switching signal in response to the linear predict signal and the ramp signal;
   a first comparator, coupled to receive the linear predict signal and a first threshold for comparison;

a second comparator, coupled to receive the ramp signal and a second threshold for comparison;
wherein a setting terminal of the SR-flip-flop is controlled by an output of the first comparator and a resetting terminal of the SR-flip-flop is controlled by an output of the second comparator.

\* \* \* \* \*